United States Patent
Goel

(10) Patent No.: US 12,363,198 B2
(45) Date of Patent: Jul. 15, 2025

(54) METHODS, SYSTEMS, AND COMPUTER READABLE MEDIA FOR OVERRIDING A PREFERRED LOCALITY ATTRIBUTE VALUE USING PREFERRED LOCATION ATTRIBUTE VALUES AND TRAFFIC DISTRIBUTION ATTRIBUTE VALUES

(71) Applicant: Oracle International Corporation, Redwood Shores, CA (US)

(72) Inventor: Yesh Goel, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 46 days.

(21) Appl. No.: 18/519,982

(22) Filed: Nov. 27, 2023

(65) Prior Publication Data
US 2025/0175533 A1  May 29, 2025

(51) Int. Cl.
*H04L 67/51* (2022.01)
*H04L 67/02* (2022.01)
*H04L 67/61* (2022.01)

(52) U.S. Cl.
CPC .............. *H04L 67/51* (2022.05); *H04L 67/02* (2013.01); *H04L 67/61* (2022.05)

(58) Field of Classification Search
CPC .......... H04L 67/51; H04L 67/02; H04L 67/61
See application file for complete search history.

(56) References Cited

U.S. PATENT DOCUMENTS

| 11,930,083 B2 | 3/2024 | Goel et al. |
| 2020/0036754 A1 | 1/2020 | Livanos |

(Continued)

FOREIGN PATENT DOCUMENTS

| WO | WO 2020/083516 A1 | 4/2020 |
| WO | WO 2021/110287 A1 | 6/2021 |
| WO | WO 2022152870 A1 | 7/2022 |

OTHER PUBLICATIONS

Notice of Allowance for U.S. Appl. No. 17/397,968 dated Dec. 28, 2023.

(Continued)

*Primary Examiner* — Schquita D Goodwin
*Assistant Examiner* — Joseph M Cousins
(74) *Attorney, Agent, or Firm* — Jenkins, Taylor & Hunt, P.A.

(57) ABSTRACT

A method for overriding a preferred locality attribute value using preferred location attribute values and traffic distribution attribute values to facilitate a desired traffic distribution among producer NFs includes receiving, from a query originator, an NF discovery request including a target NF type attribute value and a preferred locality attribute value. The method further includes selecting NF profiles that have an NF type attribute value that matches the target NF type attribute value and a locality attribute value that matches a preferred location attribute value mapped to the preferred locality attribute value. The method further includes modifying at least one attribute value in the NF profiles according to traffic distribution attribute values to achieve a predetermined distribution of SBI request message traffic among producer NFs by the query originator. The method further includes generating and sending an NF discovery response including the NF profiles.

20 Claims, 10 Drawing Sheets

(56) References Cited

U.S. PATENT DOCUMENTS

| | | | |
|---|---|---|---|
| 2022/0039101 A1 | 2/2022 | Wang et al. | |
| 2022/0264432 A1 | 8/2022 | Reyes et al. | |
| 2022/0346188 A1 | 10/2022 | Malhotra | |
| 2023/0052267 A1 | 2/2023 | Goel et al. | |
| 2023/0179681 A1 | 6/2023 | Krishan | |
| 2023/0216929 A1* | 7/2023 | Landais | H04W 8/005 709/223 |
| 2024/0022895 A1* | 1/2024 | Shahdad | H04W 8/12 |

OTHER PUBLICATIONS

Applicant-Initiated Interview Summary for U.S. Appl. No. 17/397,968 dated Dec. 14, 2023.

Non-Final Office Action for U.S. Appl. No. 17/397,968 (Aug. 23, 2023).

Applicant-Initiated Interview Summary for U.S. Appl. No. 17/397,968 (Jul. 24, 2023).

Advisory Action for U.S. Appl. No. 17/397,968 (Jul. 14, 2023).

Final Office Action for U.S. Appl. No. 17/397,968 (Apr. 27, 2023).

Examiner-Initiated Interview Summary for U.S. Appl. No. 17/397,968 (Mar. 21, 2023).

Non-Final Office Action for U.S. Appl. No. 17/397,968 (Dec. 9, 2022).

Commonly-Assigned, co-pending U.S. Appl. No. 17/397,968 for "Methods, Systems, and Computer Readable Media for Processing Network Function (NF) Discovery Requests at NF Repository Function (NRF) Using Prioritized Lists of Preferred Locations" (Unpublished, filed Aug. 9, 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).

"3rd Generation Partnership Project; Technical Specification Group Core Network and Terminals; 5G System; Network Function Repository Services; Stage 3 (Release 18)" 3GPP TS 29.510, V18.4.0, pp. 1-373 (Sep. 2023).

* cited by examiner

METHODS, SYSTEMS, AND COMPUTER READABLE MEDIA FOR OVERRIDING A PREFERRED LOCALITY ATTRIBUTE VALUE USING PREFERRED LOCATION ATTRIBUTE VALUES AND TRAFFIC DISTRIBUTION ATTRIBUTE VALUES

TECHNICAL FIELD

The subject matter described herein relates to managing communications among 5G network functions (NFs). More particularly, the subject matter described herein relates to methods, systems, and computer readable media for overriding a preferred locality attribute value using preferred location attribute values and traffic distribution attribute values.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

One problem that may occur in 5G and other types of networks is that consumer NFs and SCPs may lack pre-established HTTP connections with alternate producer NFs when a primary NF fails, and producer NF selection is based on preferred locality. For example, during NF discovery, a consumer NF or SCP may specify a preferred locality attribute in an NF discovery request transmitted to the NRF. The NRF receives the NF discovery request, reads the preferred locality attribute value and the target NF type attribute value from the NF discovery request, and returns, in an NF discovery response, NF profiles of producer NFs corresponding to the target NF type and the preferred locality attribute value. The querying consumer NF or SCP then establishes HTTP connections with the most preferred producer NF whose NF profile is returned in the NF discovery response. The most preferred producer NF is the producer NF having in its NF profile the lowest value of the priority attribute. Traffic is directed to the most preferred producer NF. HTTP connections are not established with the other NFs whose NF profiles are returned in the NF discovery response. If the most preferred producer NF fails, the consumer NF or SCP is required at the time of the failure to set up HTTP connections with the next most-preferred producer NF whose NF profile is returned in the NF discovery response and direct all traffic to that producer NF. The time required to establish HTTP connections with a different producer NF each time the producer NF currently receiving all of the traffic fails can cause egress message queues at the producer NF or SCP to grow and can even result in dropped messages or packets.

In light of these and other difficulties, there exists a need for improved methods, systems, and computer readable media for processing NF discovery requests to return NF profiles to a consumer NF or SCP in a manner that achieves a desired traffic distribution among producer NFs and reduced latency when a producer NF failover occurs.

SUMMARY

A method for overriding a preferred locality attribute value using preferred location attribute values and traffic distribution attribute values to facilitate a desired traffic distribution among producer network functions (NFs) includes receiving, by an NF repository function (NRF) and from a query originator, an NF discovery request including a target NF type attribute value and a preferred locality attribute value. The method further includes selecting, by the NRF, NF profiles that have an NF type attribute value that matches the target NF type attribute value and a locality attribute value that matches one of a plurality of preferred location attribute values mapped to the preferred locality attribute value. The method further includes modifying, by the NRF, at least one attribute value in the NF profiles according to traffic distribution attribute values to achieve a predetermined distribution of service based interface (SBI) request message traffic among producer NFs by the query originator. The method further includes generating and sending, by the NRF and to the query originator, an NF discovery response including the NF profiles.

According to another aspect of the subject matter described herein, receiving an NF discovery request from the query originator includes receiving an NF discovery request from a consumer NF or a service communication proxy (SCP).

According to another aspect of the subject matter described herein, selecting the NF profiles includes accessing a locality and traffic distribution mappings database including records that map combinations of target NF type and preferred locality attribute values to the preferred location attribute values and the traffic distribution attribute values.

According to another aspect of the subject matter described herein, the preferred location attribute values correspond to locations selected by a network operator to override the preferred locality attribute value in the NF discovery request.

According to another aspect of the subject matter described herein, the preferred location attribute values include, in at least one record in the locality and traffic distribution mappings database, a primary location attribute value, a secondary location attribute value, and a tertiary location attribute value. The method of claim 3 wherein the traffic distribution attribute values comprise traffic distribution percentages.

According to another aspect of the subject matter described herein, modifying at least one attribute value in the NF profiles according to the traffic distribution attribute values to achieve the predetermined distribution of SBI request message traffic includes computing fake capacity attribute values using the traffic distribution percentages and setting capacity attribute values in the NF profiles to the fake capacity attribute values.

According to another aspect of the subject matter described herein, the method includes, at the query originator, receiving the NF discovery response, setting up hypertext transfer protocol (HTTP) connections with each of the producer NFs corresponding to the NF profiles and distributing the SBI request message traffic among the producer NFs according to the capacity attribute values in the NF profiles.

According to another aspect of the subject matter described herein, the method includes, at the query originator, detecting failure of one of the producer NFs and redistributing the SBI request message traffic to available ones of the producer NFs using the HTTP connections.

According to another aspect of the subject matter described herein, redistributing the SBI request message traffic to the available ones of the producer NFs includes distributing SBI request message traffic among the available ones of the producer NFs in accordance with relative values of the capacity attributes of the NF profiles of the available ones of the producer NFs. According to another aspect of the subject matter described herein, a system for overriding a preferred locality attribute value using preferred location attribute values and traffic distribution attribute values to facilitate a desired traffic distribution among producer network functions (NFs) is provided. The system includes a network function (NF) repository function (NRF) including at least one processor and a memory. The system further includes an NF discovery manager implemented by the at least one processor for receiving, from a query originator, an NF discovery request including a target NF type attribute value and a preferred locality attribute value, selecting NF profiles that have an NF type attribute value that matches the target NF type attribute value and a locality attribute value that matches one of a plurality of preferred location attribute values mapped to the preferred locality attribute value, modifying at least one attribute value in the NF profiles according to traffic distribution attribute values to achieve a predetermined distribution of service based interface (SBI) request message traffic among producer NFs by the query originator, and generating and sending to the query originator, an NF discovery response including the NF profiles.

According to another aspect of the subject matter described herein, the query originator comprises a consumer NF or a service communication proxy (SCP).

According to another aspect of the subject matter described herein, the system includes a locality and traffic distribution mappings database including records that map combinations of target NF type and preferred locality attribute values to preferred location attribute values and the traffic distribution attribute values.

According to another aspect of the subject matter described herein, in selecting the NF profiles, the NF discovery manager is configured to access the locality and traffic distribution mappings database using the target NF type attribute value and the preferred locality attribute value in the NF discovery request.

According to another aspect of the subject matter described herein, the preferred location attribute values correspond to locations selected by a network operator to override the preferred locality attribute value in the NF discovery request.

According to another aspect of the subject matter described herein, the preferred location attribute values include, in at least one record in the locality and traffic distribution mappings database, at least a primary location attribute value, a secondary location attribute value, and a tertiary location attribute value.

According to another aspect of the subject matter described herein, the traffic distribution attribute values comprise traffic distribution percentages.

According to another aspect of the subject matter described herein, in modifying at least one attribute value in the NF profiles according to the traffic distribution attribute values to achieve the predetermined distribution of SBI request message traffic among the producer NFs, the NF discovery manager is configured to compute fake capacity attribute values using the traffic distribution percentages and set capacity attribute values in the NF profiles to the fake capacity attribute values.

According to another aspect of the subject matter described herein, the NF discovery manager is configured to maintain configured priority attribute values in the NF profiles.

According to another aspect of the subject matter described herein, a non-transitory computer readable medium having stored thereon executable instructions that when executed by a processor of a computer control the computer to perform steps is provided. The steps include receiving, by a network function (NF) repository function (NRF) and from a query originator, an NF discovery request including a target NF type attribute value and a preferred locality attribute value. The steps further include selecting, by the NRF, NF profiles that have an NF type attribute value that matches the target NF type attribute value and a locality attribute value that matches one of a plurality of preferred location attribute values mapped to the preferred locality attribute value. The steps further include modifying, by the NRF, at least one attribute value in the NF profiles according to traffic distribution attribute values to achieve a predetermined distribution of service based interface (SBI) request message traffic among producer NFs by the query originator. The steps further include generating and sending, by the NRF and to the query originator, an NF discovery response including the NF profiles.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
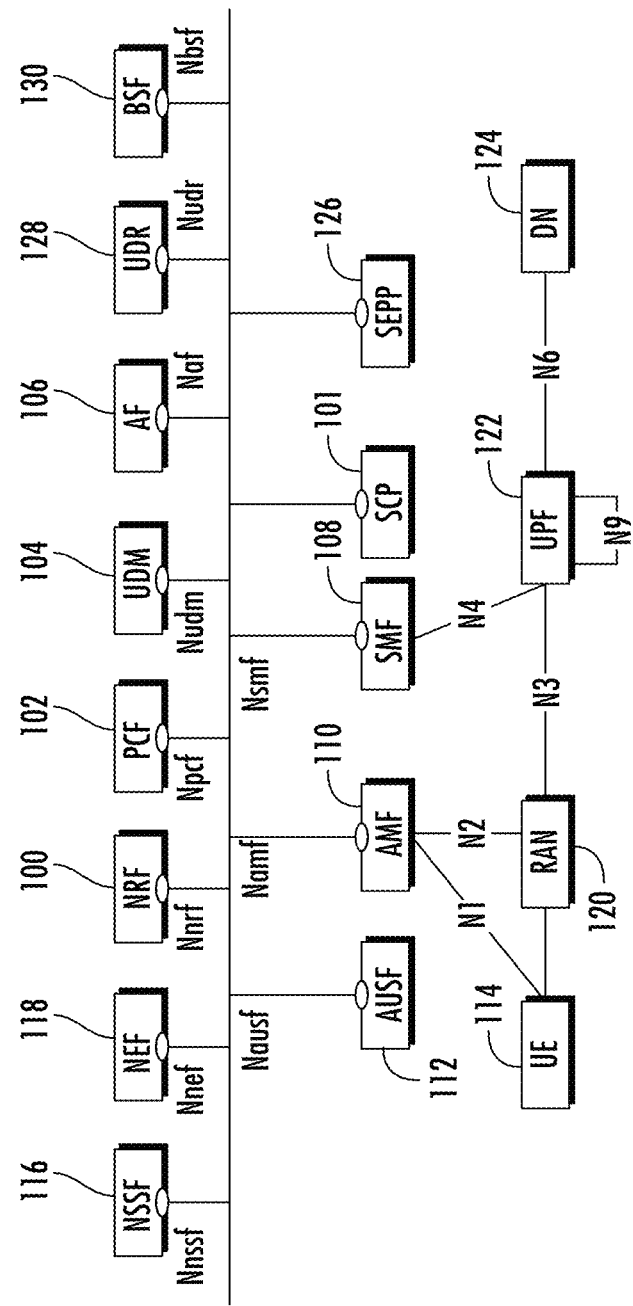
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between PDU sessions and PCFs.

Figure 2:
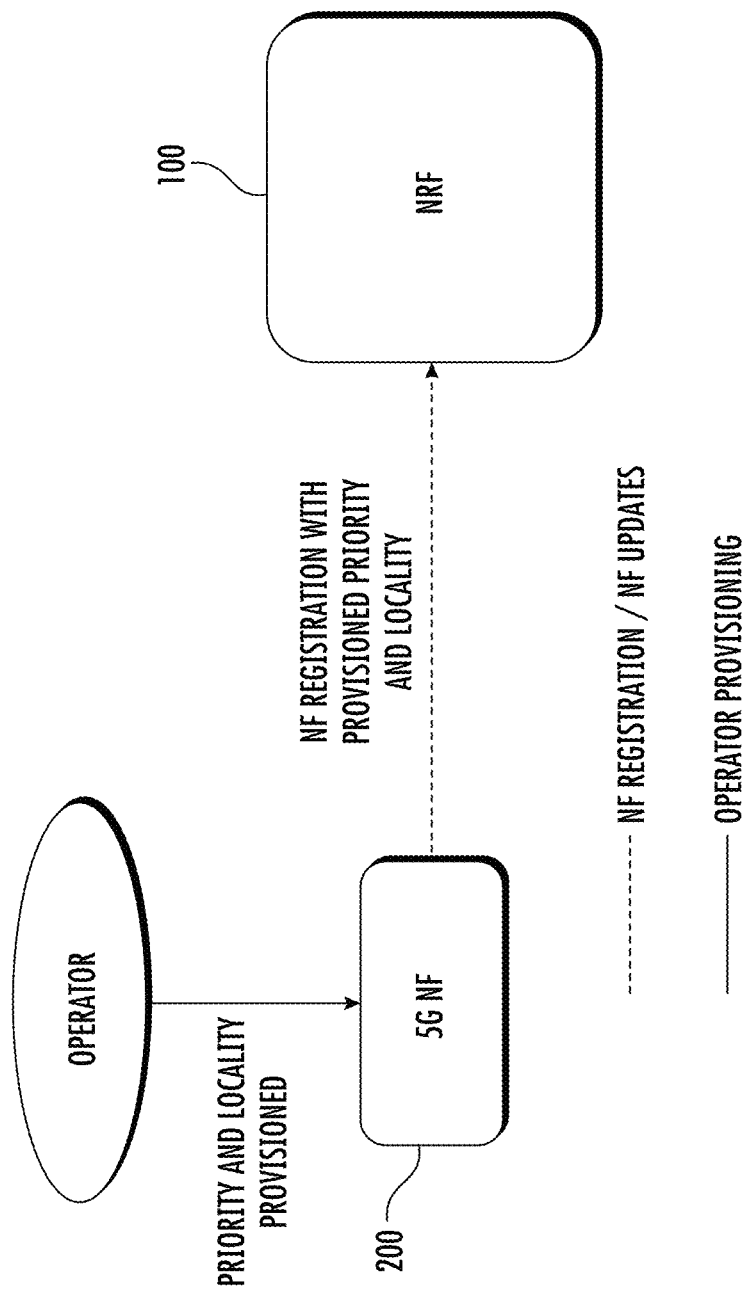
FIG. 2 is a network diagram illustrating NF registration with an NRF.

As stated above, one problem that can occur in 5G and other types of networks is latency and dropped messages when re-routing traffic upon failure of a primary or most-preferred producer NF. To further explain the problem and the solution described herein, an overview of NF registration, NF discovery, and processing of NF profiles using the preferred locality attribute will now be described. FIG. 2 is a network diagram illustrating NF registration with an NRF. In FIG. 2, a network operator provisions a 5G NF 200 with priority and locality attribute values. 5G NF 200 registers its NF profile with NRF 100. The NF profile includes the provisioned priority and locality attribute values. NRF 100 stores the NF profile of 5G NF 200 in an NF profiles database maintained by NRF 100. NRF 100 allows discovery of the NF profile by other NFs using the NF discovery service operation.

Figure 3A:
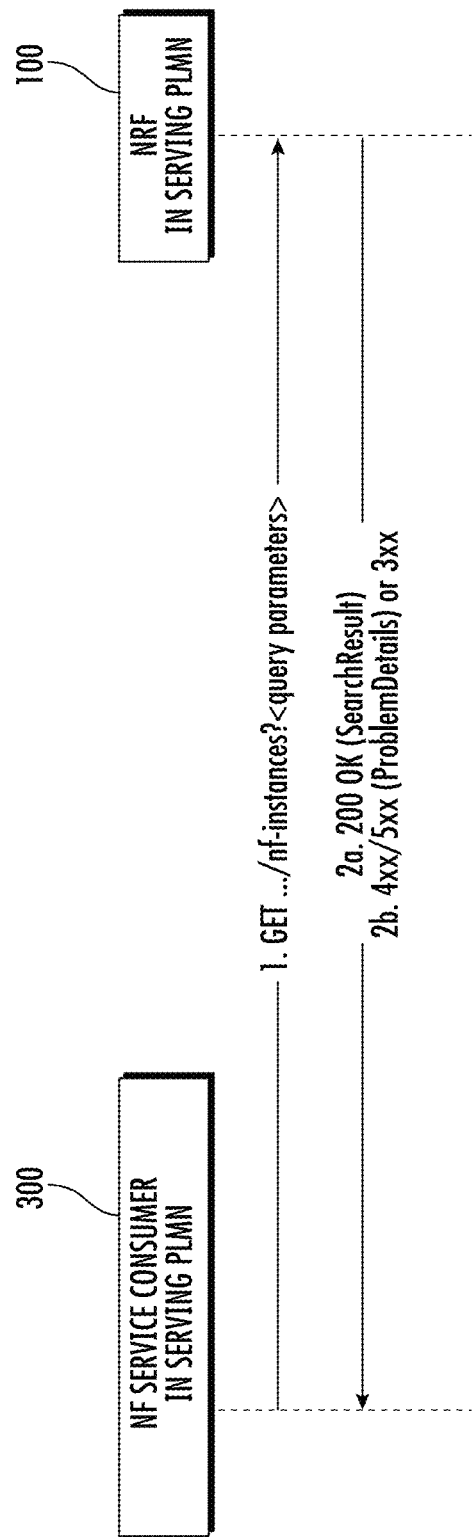
FIG. 3A is a diagram illustrating exemplary messages exchanged in an NF discovery service operation.

FIG. 3A is a message flow diagram illustrating exemplary messages exchanged in the NF discovery service operation. In FIG. 3A, in step 1a consumer NF 300 sends an NF discovery request to NRF 100. The NF discovery request includes query parameters, such as a target NF type query parameter and a preferred locality query parameter. NF 100 receives the NF discovery request, uses the query parameters to perform a lookup the NF profiles database, locates one or more NF profiles that match the query parameters, and returns the NF profiles to consumer NF 300 in an NF discovery response, as indicated by step 2a. If processing of the NF discovery request is not successful or if an error occurs, NRF 100 responds as indicated in step 2b with a 4xx or 5xx error response or a 3xx response when the NF discovery request is redirected to another NRF.

Figure 3B:
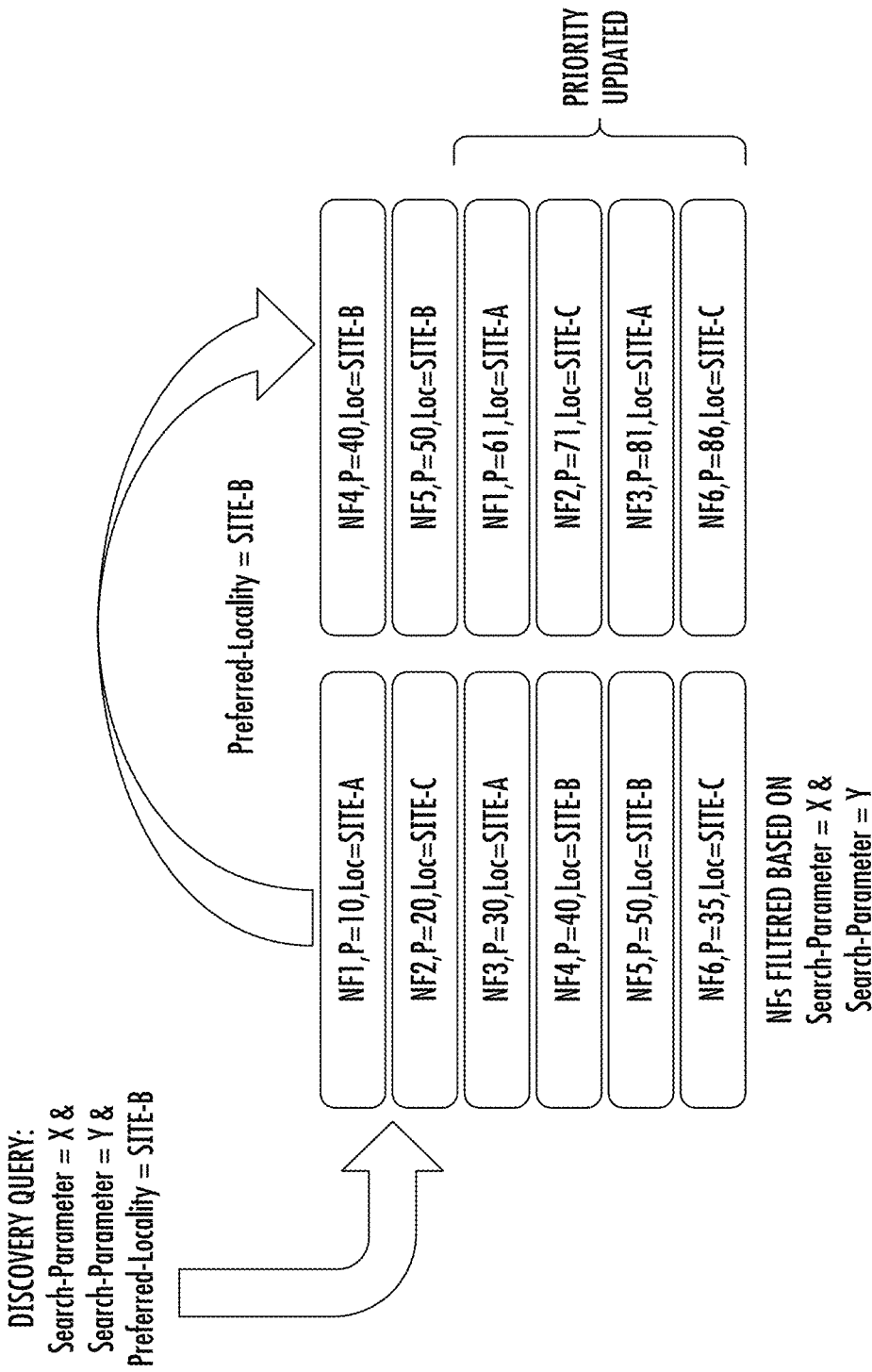
FIG. 3B is a diagram illustrating the use of the preferred locality attribute value to adjust priority attribute values in NF profiles.

FIG. 3B is a diagram illustrating the use of the preferred locality attribute value to adjust priority attribute values in NF profiles. In FIG. 3B, the NF discovery query includes search parameters and a preferred locality attribute value. Preferred locality is an attribute that is sent by consumer NFs during NF discovery that, when present, indicates an operator-configured favorite location of a producer NF to serve a consumer NF. The preferred locality is typically set to be the consumer NF locality. The NRF changes the priorities in the NF profiles returned in the NF discovery response such that the priority of the NF profile having the locality attribute that matches the preferred locality is set to be lower (more preferred) than the priorities of other NF profiles. In FIG. 3B, the NF profiles on the left-hand side are those that match the query parameters from the NF discovery request other than the preferred locality. Each of the NF profiles has a configured priority attribute value. The NRF then changes the priority attribute values such that the NF profiles with a locality attribute value that matches the preferred locality attribute value of SITE-B are configured with lower priority attribute values than the NF profiles of NFs with a locality attribute value that does not match the preferred locality attribute value of SITE-B. In the illustrated example, the NF profiles of NF4 and NF5 each have a preferred locality attribute value of SITE-B, and their priority attribute values are changed to 40 and 50, respectively. The priority attribute values of NF profiles of NF1-NF3, NF5, and NF6 are also modified to be higher than 50.

Figure 4:
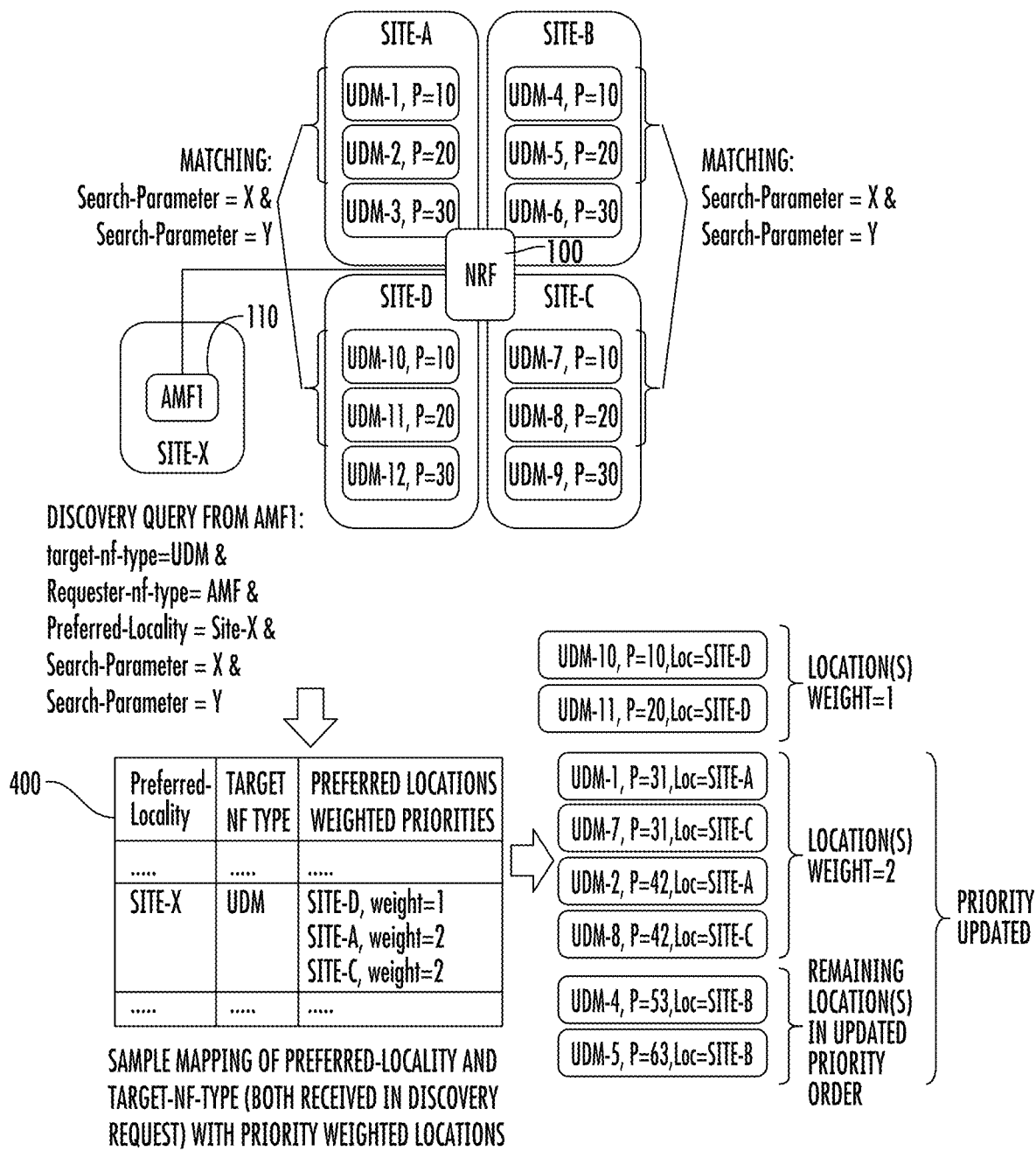
FIG. 4 is a network diagram illustrating the overriding of a preferred locality attribute value with a prioritized list of preferred locations.

FIG. 4 is a network diagram illustrating the overriding of a preferred locality attribute value with a prioritized list of preferred locations. In FIG. 4, NRF 100 is configured with mappings between preferred locality attribute values and preferred locations, where each location is associated with a weight value that governs how priority attribute values in NF profiles that have NF type attribute values that match the target NF type and locality attribute values that match the preferred locations will be adjusted. In the mapping in FIG. 4, a target NF type of UDM and a locality of SITE-X combination is mapped to:

SITE-D (most optimized from SITE-X),
SITE A and C (equally optimized from SITE-X), and
SITE B (least optimized from SITE-X).

There may be multiple ways to associate priority with locations. In FIG. 4, weights are used to adjust the priorities of NF profiles. In alternate example, priority values in ascending or descending order with respect to preferred locations may be used. In yet another alternate example, locations can be assigned to fixed categories indicating priorities. Examples of such categories include primary, secondary, tertiary, and remainder.

Upon receiving an NF discovery request with a preferred-locality attribute value and a target NF type attribute value, NRF 100 fetches preferred locations with their configured priorities from a locality mapping database 400. NRF 100 accesses the NF profiles database and locates the NF profiles having an NF type attribute value that matches the value of the target NF type attribute value in the NF discovery request.

In the illustrated example, AMF 110 specifies a target NF type of UDM and a preferred locality of SITE-X in an NF discovery query. NRF 100 locates NF profiles with a NF type attribute of UDM. NRF 100 uses the target NF type of UDM and preferred locality attribute value of SITE-X to access preferred locality mappings database 400 and locates a matching record. NRF 100 uses the locality attribute values and priority weights to adjust the priority attribute values of the NF profiles with NF type attribute values that match the target NF type. In the mapping, SITE-D is the most preferred location. UDM-10 and UDM-11 are located at SITE-D, and the priority attribute values of the NF profiles of UDM-10 and UDM-11 are set to 10 and 20, respectively, indicating that UDM-10 and UDM-11 are the most preferred UDMs. SITE-A and SITE-C are the next most-preferred locations. NRF 100 uses the weight value of 2 to set the priority attribute values of UDM-1, UDM-7, UDM-2, and UDM-8 to 31, 31, 42, and 42, respectively. UDM-4 and UDM-5 are located at SITE-B, which is not one of the preferred locations. Accordingly, NRF 100 sets the priority attribute values of the NF profiles of UDM-4 and UDM-5 to 53, and 63, respectively, indicating least preferred status.

After locating the NF profiles and adjusting the priority attribute values using the mapping and associated weights, NRF 100 transmits the list of NF profiles to AMF 110. AMF 110 uses the preferred NF profiles and associated priority attribute values to select one of the UDMs to provide service to AMF 110.

Figure 5:
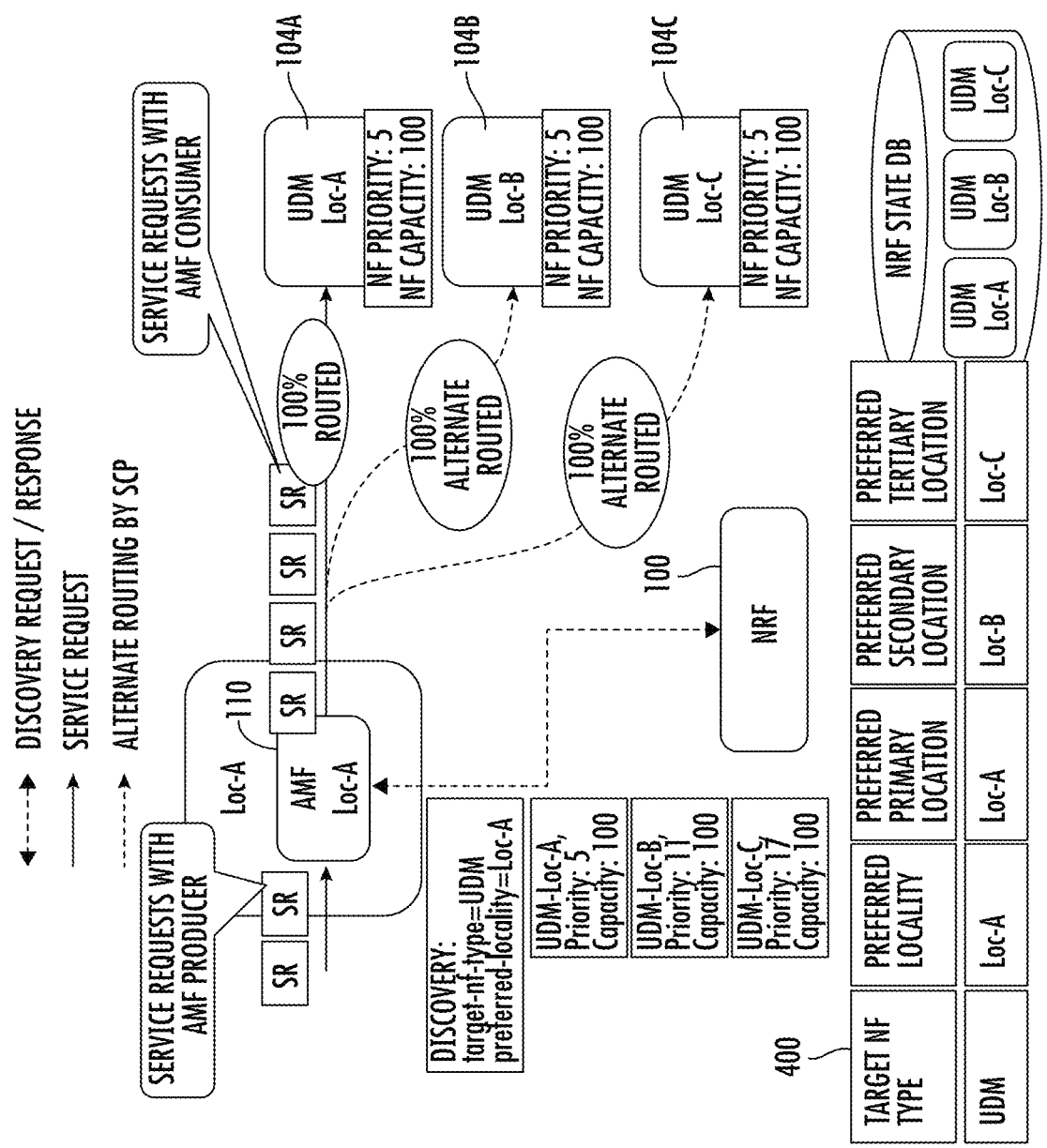
FIG. 5 is a network diagram illustrating an alternate routing scenario.

FIG. 5 is a network diagram illustrating an alternate routing scenario. In FIG. 5, NRF 100 stores, in locality mappings database 400, a mapping between target NF type UDM and locality A to locations A, B, and C, where location A is primary, location B is secondary, and location C is tertiary. NRF 100 receives an NF discovery request with a target NF type of UDM and a preferred locality attribute value of location A. NRF 100 accesses the NF profiles database and locates the NF profiles of UDMs 104A, 104B, and 104C at locations A, B, and C, respectively. NRF 100 adjusts the priorities of the NF profiles such that UDM 104A at location A has the lowest priority of 5, UDM 104B at location B has a secondary priority of 11, and UDM 104C at location C has a tertiary priority of 17. AMF 110 initially directs all service requests to the UDM at location A. When UDM 104A at location A fails, AMF 110 directs all service requests to UDM 104B at location B. When UDM 104B at location B fails, AMF 110 directs all of the service requests to UDM 104C at location C. The alternate routing of service requests can be performed by AMF 110 or by an SCP in the case of indirect communications according to 3GPP communication model C or model D.

Prior to the priority adjustment, the configured priorities of the NF profiles in FIG. 5 are equal. If the priorities of the NF profiles of NFs provided to AMF 110 in the NF discovery response are equal, AMF 110 (or an SCP) may load balance SBI requests among UDMs 104A, 104B, and 104C. However, with the priority adjustment mechanism illustrated in FIGS. 4 and 5, the routing scenario illustrated in FIG. 5 is mandatory. That is, if the priorities of the NF profiles are unequal, the consumer NF or SCP will route SBI requests to the available producer NF with the lowest priority attribute value. When producer NF with the lowest priority attribute value fails, the consumer NF will select the producer NF with the next lowest priority attribute value from the available producer NFs, establish HTTP connections with the selected producer NF, and route all (UDM-directed) SBI request message traffic to the newly selected producer NF.

Figure 6:
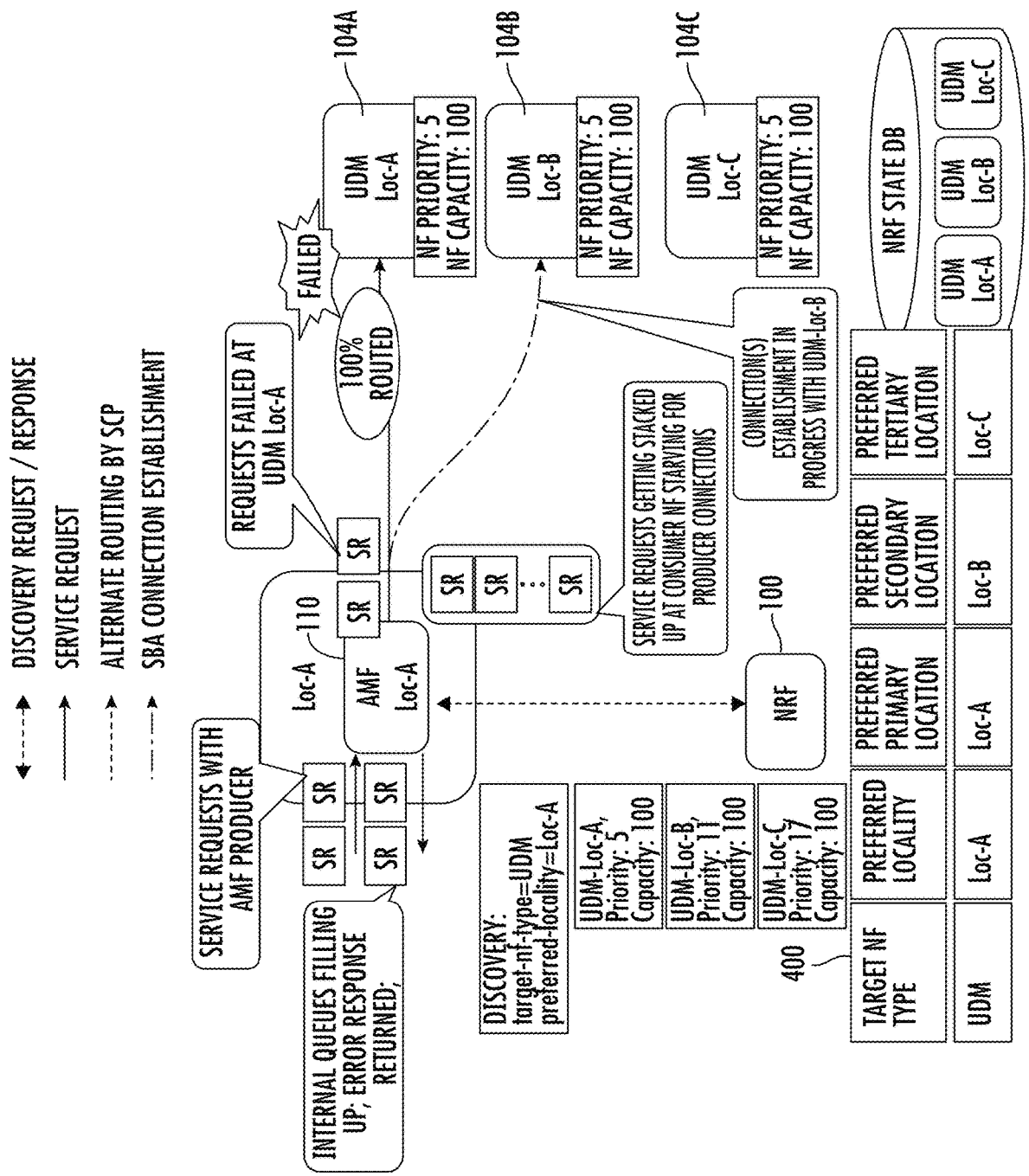
FIG. 6 is a network diagram illustrating a problem that can occur when a most preferred producer NF fails.

FIG. 6 is a network diagram illustrating a problem that can occur when a most preferred producer NF fails with the alternate routing scenario illustrated in FIG. 5. In FIG. 6, AMF 110 obtains the NF profiles of UDMs 104A, 104B, and 104C in an NF discovery response where NRF 100 has adjusted the configured priorities using the mappings in locality mappings database 400. AMF 110 initially routes all of the service requests to UDM 104A. Subsequently, UDM 104A fails, and AMF 110 routes all of the service requests that would have been sent to UDM 104A to UDM 104B. However, at the time of the failover, new HTTP2 connections with UDM 104B are required to be established at runtime. While the new HTTP2 connections are being established, AMF 110 continues to generate service requests. If indirect communication according to 3GPP communication model C or D is implemented, the SCP may continue to receive service requests while the SCP is establishing HTTP2 connections with UDM 104B. The continued generation of service requests by AMF 110 or the receiving of service requests by the SCP while the HTTP2 connections are being established may lead to latency and/or failure of transactions in the network due to internal queues of AMF 110 or the SCP filling up with service requests. A similar problem occurs when UDM 104B fails.

Figure 7:
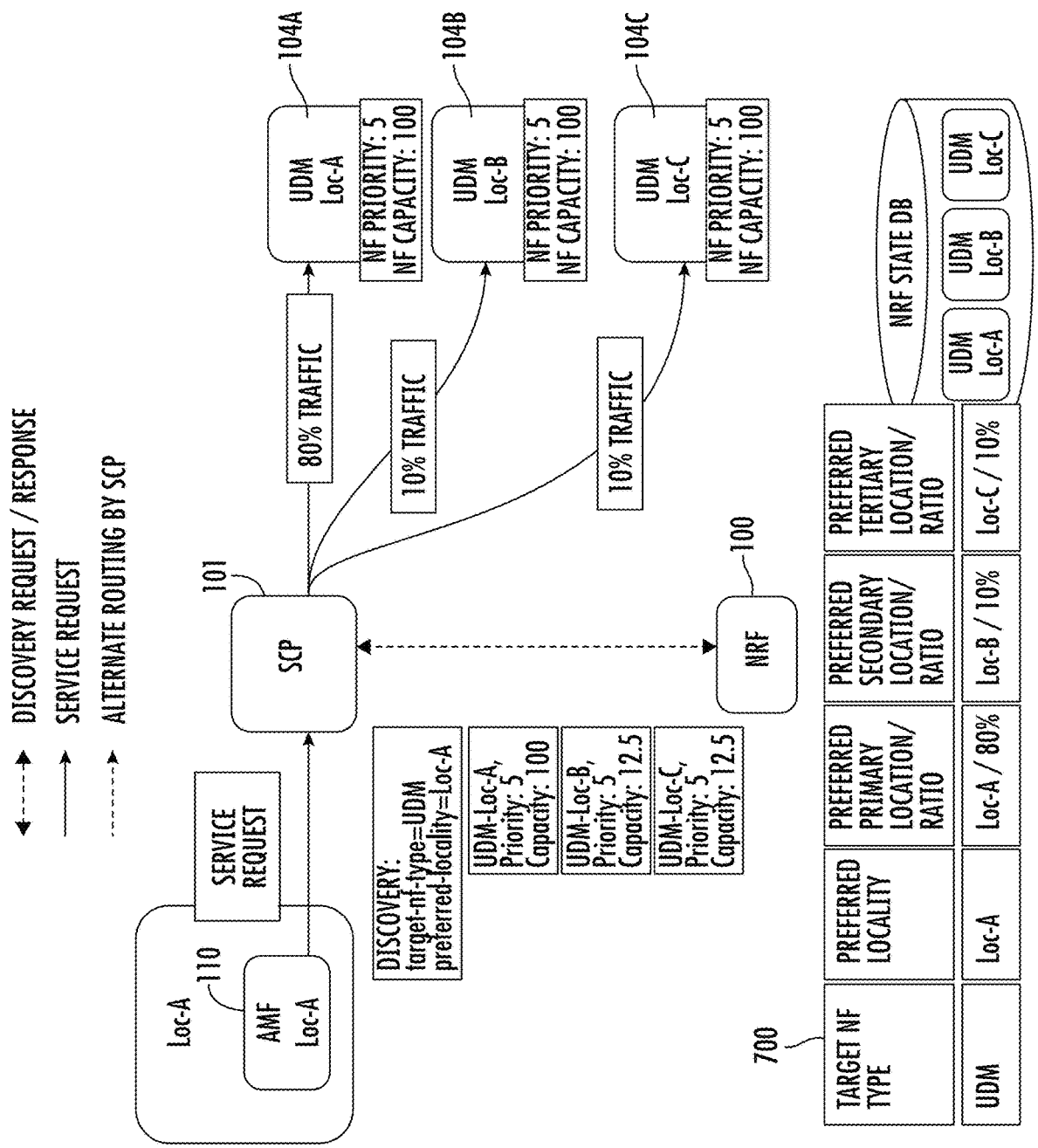
FIG. 7 is a network diagram illustrating overriding a preferred locality attribute value with preferred location attribute values and traffic distribution attribute values to achieve a desired traffic distribution among producer NFs and reduced latency when one or more of the producer NFs fails.

FIG. 7 is a network diagram illustrating overriding a preferred locality attribute value with preferred location attribute values and traffic distribution attribute values to achieve a desired traffic distribution among producer NFs. In FIG. 7, NRF 100 includes a locality and traffic distribution mappings database 700 that includes records, where each record maps a combination of target NF type and preferred locality attribute values to primary, secondary, and tertiary location attribute values and corresponding traffic distribution attribute values. In the illustrated example, the combination of a target NF type attribute value of "UDM" and preferred locality of "Loc-A" maps to a primary preferred location attribute value of "Loc-A" and a traffic distribution attribute value of 80%, a secondary preferred location attribute value of "Loc-B" and a traffic distribution attribute value of 10%, and a tertiary location attribute value of "Loc-C" and a traffic distribution attribute value of 10%. When NRF 100 receives an NF discovery request with a target NF type attribute value of "UDM" and a preferred locality of "Loc-A", NRF 100 will return the NF profiles of UDMs 104A, 104B, and 104C respectively located in locations A, B, and C. Rather than changing the priorities according to the locality preferences, NRF 100 maintains the configured priorities in the NF profiles of UDMs 104A, 104B, and 104C. In the illustrated example, the configured priority attribute value of each of UDMs 104A, 104B, and 104C is 5. To facilitate the desired traffic distribution of SBI requests among producer NFs, NRF 100 computes fake capacity attribute values to achieve the traffic distribution among producer NFs specified by the traffic distribution attribute values and includes the fake capacity attribute values in the NF profiles returned to the consumer NF or SCP. The capacity attribute values are fake in the sense that the correspond to the traffic distribution desired by the network operator rather than the relative capacities of the producer NFs. In the illustrated example, to calculate the fact capacity attribute values, NRF 100 sets the capacity of UDM 104A to its current capacity of 100. NRF 100 then computes the capacities of the remaining UDMs according to the traffic distribution percentages. For example, the fake capacity attribute value of UDM 104B may be calculated as follows:

$$\frac{\text{Capacity}_{UDM\,B}}{\text{Capacity}_{UDM\,A}} = \frac{\text{Traffic Distribution Atribute}_{UDM\,B}}{\text{Traffic Distribution Atribute}_{UDM\,A}}$$

$$\frac{\text{Capacity}_{UDM\,B}}{100} = \frac{10}{80}$$

$$\text{Capacity}_{UDM\,B} = 12.5$$

NRF 100 may perform a similar calculation to determine the (fake) capacity of 12.5 for UDM 104C.

The consumer NF or SCP will use the fake capacity attribute values to distribute traffic to producer NFs. In the illustrated example, the traffic distribution attribute values are 80%, 10%, and 10% for UDMs 104A, 104B, and 104C, respectively. To achieve the desired traffic distribution, NRF 100 computes the capacity attribute values of 100, 12.5, and 12.5 for UDMs 104A, 104B, and 104C, respectively.

SCP 101 receives the NF profiles with the computed fake capacity attribute values, establishes HTTP connections with each of UDMs 104A, 104B, and 104C, and forwards SBI requests to each of UDMs 104A, 104B, and 104C in accordance with the computed capacity attribute values. When one of UDMs 104A, 104B, and 104C fails, SCP 101 forwards traffic to the remaining UDMs in accordance with their relative traffic distribution ratios. For example, if UDM 104A fails, traffic will be distributed between UDMs 104B and 104C with 50% of the traffic going to UDM 104B and 50% of the traffic going to UDM 104C. In example, if UDM 104B fails, SCP 101 would adjust traffic distribution between UDMs 104A and 104C such that UDM 104A receives 87.5% of the traffic, and UDM 104C receives 12.5% of the traffic.

One advantage of the implementation illustrated in FIG. 7 over that illustrated in FIG. 6 is that by forcing traffic to be distributed among producer NFs using fake capacity attribute values, NRF 100 causes SCP 101 to establish HTTP connections with each producer NF whose NF profile is returned in the NF discovery response. As a result, when one or more of the producer NFs fails, traffic can be shifted to the remaining producer NFs without having to go establish HTTP connections with the remaining producer NFs at the time of failure. The existing HTTP connections with the remaining producer NFs can be re-used to handle the traffic that would have been handled by the failed producer NF.

Figure 8:
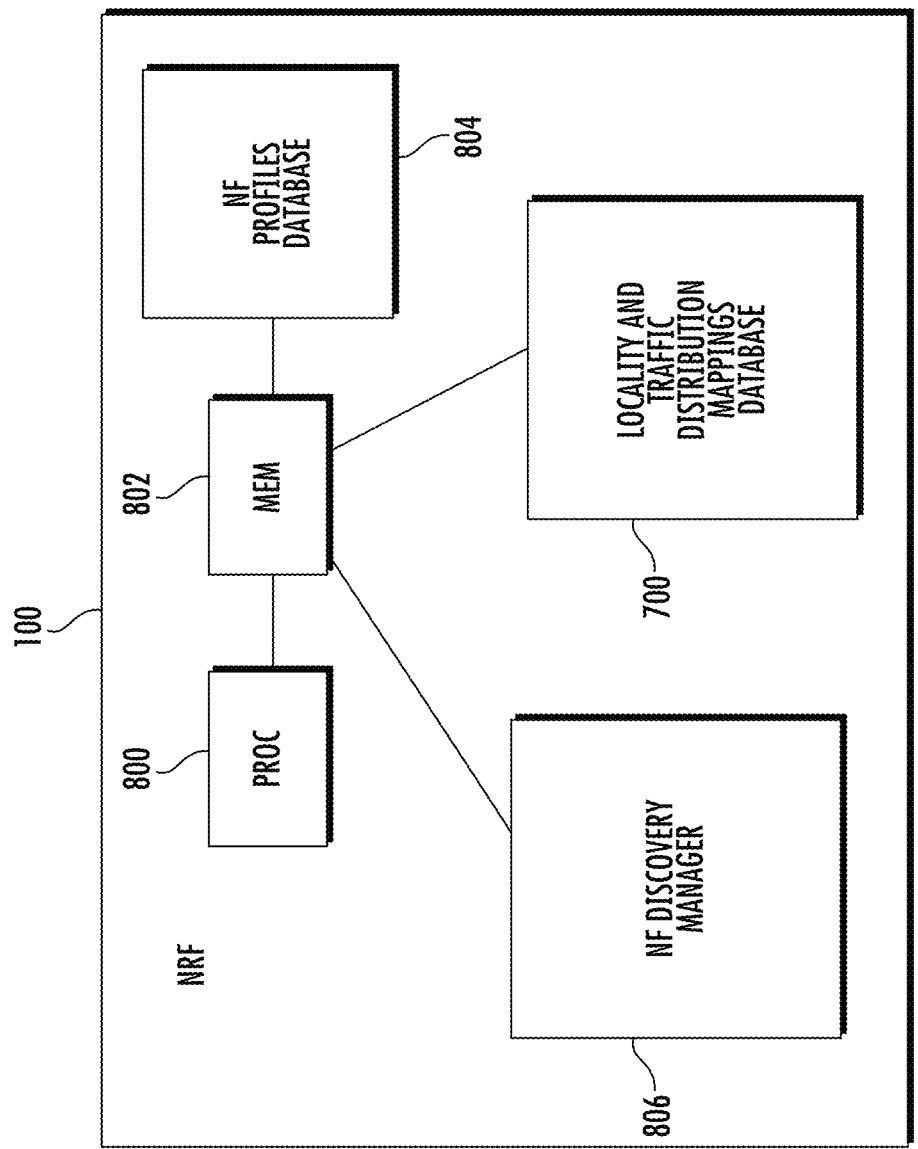
FIG. 8 is a block diagram illustrating an exemplary architecture of an NRF for overriding a preferred locality attribute value with preferred location attribute values and traffic distribution attribute values to achieve a desired traffic distribution among producer NFs.

FIG. 8 is a block diagram illustrating an exemplary architecture of an NRF for overriding a preferred locality attribute value with preferred location attribute values and traffic distribution attribute values to achieve a desired traffic distribution among producer NFs. Referring to FIG. 8, NRF 100 includes at least one processor 800 and memory 802. NRF 100 further includes an NF profiles database 804 stored in memory 802. NF profiles database 804 stores NF profiles of producer NFs that are registered with NRF 100. NRF 100 further includes a target NF type and preferred locality and traffic distribution mappings database 700 (also stored in memory 802) that includes records that include mappings between combinations of 1) target NF type and preferred locality attribute values and 2) preferred locations and traffic distribution attribute values. NRF 100 further includes an NF discovery manager 806 that receives NF discovery requests, locates NF profiles matching the query parameters in the NF discovery requests, selects NF profiles having locality attributes that match the preferred locations, and adjusts the capacity attribute values of the NF profiles to implement the desired traffic distribution specified by the traffic distribution attribute values. NF discovery manager 806 may be implemented using computer executable instructions stored in memory 802 and executable by processor 800.

Figure 9:
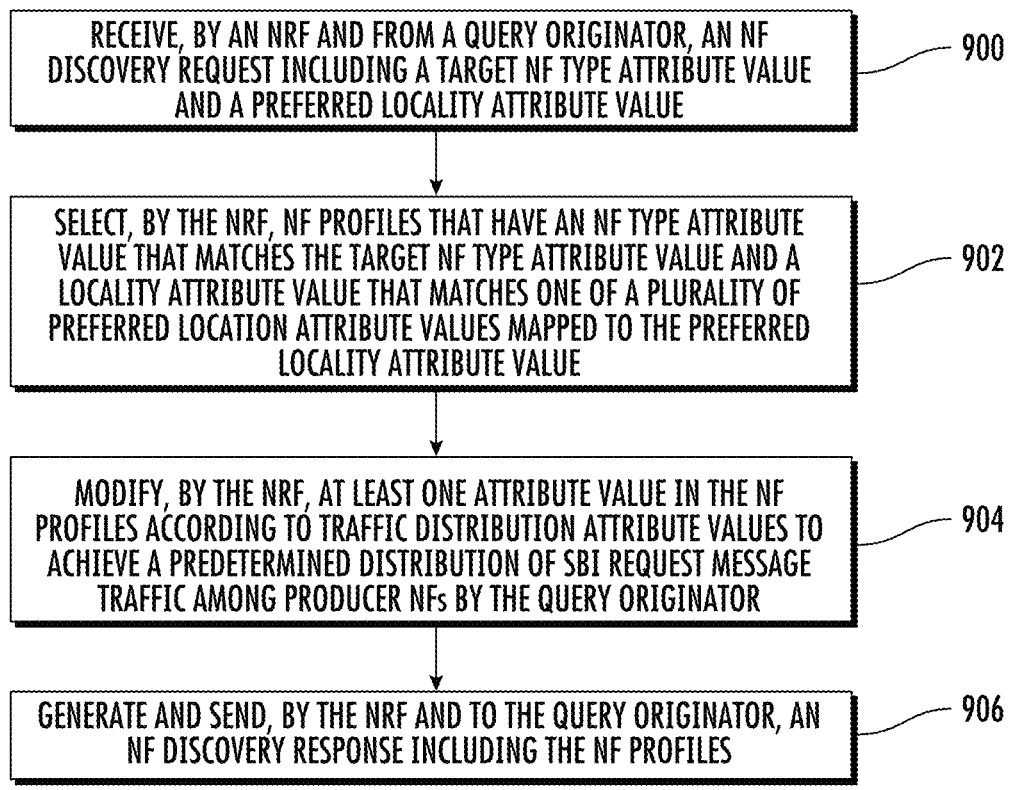
FIG. 9 is a flow chart illustrating an exemplary process for overriding a preferred locality attribute value with preferred location attribute values and traffic distribution attributes to achieve a desired traffic distribution among producer NFs.

FIG. 9 is a flow chart illustrating an exemplary process for overriding a preferred locality attribute value using preferred location attribute values and traffic distribution attribute values to facilitate a desired traffic distribution among producer NFs. Referring to FIG. 9, in step 900, the process includes receiving, by an NRF and from a query originator, an NF discovery request including a target NF type attribute value and a preferred locality attribute value. For example, NRF 100 may receive an NF discovery request from a consumer NF or an SCP. The NF discovery request may include query parameters, including a preferred locality attribute value and a target NF type attribute value.

In step 902, the process further includes selecting, by the NRF, NF profiles that have an NF type attribute value that matches the target NF type attribute value and a locality attribute value that matches one of a plurality of preferred location attribute values mapped to the preferred locality attribute value. For example, NRF 100 may access locality and traffic distribution mappings database using the preferred locality attribute value and the target NF type attribute value and locate a record that maps the combination of preferred locality and target NF type to a plurality of preferred location attribute values and traffic distribution attribute values. NRF 100 may use the target NF type and preferred location attribute values to access the NF profiles database and select NF profiles that have NF type attribute values that match the target NF type and locality attribute values that match one of the preferred location attribute values.

In step 904, the process further includes modifying, by the NRF, at least one attribute value in the NF profiles according to traffic distribution attribute values to achieve a predetermined distribution of SBI request message traffic among producer NFs by the query originator. For example, NRF 100 may compute fake capacity attribute values according to the traffic distribution attribute values obtained from the locality and traffic distribution mappings database and set the capacity attribute values in the NF profiles to be equal to the fake capacity attribute values.

In step 906, the process further includes generating and sending, by the NRF and to the query originator, an NF discovery response including the NF profiles. For example, NRF 100 may send an NF discovery response, such as a 200 OK response, with the NF profiles having modified capacity attribute values to achieve the desired distribution of SBI request message traffic.

One advantage of the solution described herein is that it facilitates failover among georedundant producer NF instances. Most/all 5G NFs have support for geo-redundancy where geo-redundant mate NFs are dimensioned and expected to take over traffic processing of the failed georedundant mate instance. By providing a solution that allows HTTP connections to be established with a geo-redundant mate producer NF prior to failure of its mate, the solution described herein reduces the likelihood of increased latency and dropped messages when a failover occurs.

The disclosure of each of the following references is hereby incorporated herein by reference in its entirety.

REFERENCES 1. 3$^{rd}$ Generation Partnership Project; Technical Specification Group Core Network and Terminals; 5G System; Network Function Repository Services; Stage 3 (Release 18) 3GPP TS 29.510 V18.4.0 (2023-09)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for overriding a preferred locality attribute value using preferred location attribute values and traffic distribution attribute values to facilitate a desired traffic distribution among producer network functions (NFs), the method comprising:
   receiving, by an NF repository function (NRF) and from a query originator, an NF discovery request including a target NF type attribute value and a preferred locality attribute value;
   selecting, by the NRF, NF profiles that have an NF type attribute value that matches the target NF type attribute value and a locality attribute value that matches one of a plurality of preferred location attribute values mapped to the preferred locality attribute value;
   modifying, by the NRF, at least one attribute value in the NF profiles according to traffic distribution attribute values to achieve a predetermined distribution of service based interface (SBI) request message traffic among producer NFs by the query originator; and
   generating and sending, by the NRF and to the query originator, an NF discovery response including the NF profiles.

2. The method of claim 1 wherein receiving the NF discovery request from the query originator includes receiving the NF discovery request from a consumer NF or a service communication proxy (SCP).

3. The method of claim 1 wherein selecting the NF profiles includes accessing a locality and traffic distribution mappings database including records that map combinations of target NF type and preferred locality attribute values to the preferred location attribute values and the traffic distribution attribute values.

4. The method of claim 3 wherein the preferred location attribute values correspond to locations selected by a network operator to override the preferred locality attribute value in the NF discovery request.

5. The method of claim 4 wherein the preferred location attribute values include, in at least one record in the locality and traffic distribution mappings database, a primary location attribute value, a secondary location attribute value, and a tertiary location attribute value.

6. The method of claim 3 wherein the traffic distribution attribute values comprise traffic distribution percentages.

7. The method of claim 6 wherein modifying at least one attribute value in the NF profiles according to the traffic distribution attribute values to achieve the predetermined distribution of SBI request message traffic includes computing fake capacity attribute values using the traffic distribution percentages and setting capacity attribute values in the NF profiles to the fake capacity attribute values.

8. The method of claim 7 comprising, at the query originator, receiving the NF discovery response, setting up hypertext transfer protocol (HTTP) connections with each of the producer NFs corresponding to the NF profiles and distributing the SBI request message traffic among the producer NFs according to the capacity attribute values in the NF profiles.

9. The method of claim 8 comprising, at the query originator, detecting failure of one of the producer NFs and redistributing the SBI request message traffic to available ones of the producer NFs using the HTTP connections.

10. The method of claim 9 wherein redistributing the SBI request message traffic to the available ones of the producer NFs includes distributing SBI request message traffic among the available ones of the producer NFs in accordance with relative values of the capacity attributes of the NF profiles of the available ones of the producer NFs.

11. A system for overriding a preferred locality attribute value using preferred location attribute values and traffic distribution attribute values to facilitate a desired traffic distribution among producer network functions (NFs), the system comprising:
a network function (NF) repository function (NRF) including at least one processor and a memory; and
an NF discovery manager implemented by the at least one processor for receiving, from a query originator, an NF discovery request including a target NF type attribute value and a preferred locality attribute value, selecting NF profiles that have an NF type attribute value that matches the target NF type attribute value and a locality attribute value that matches one of a plurality of preferred location attribute values mapped to the preferred locality attribute value, modifying at least one attribute value in the NF profiles according to traffic distribution attribute values to achieve a predetermined distribution of service based interface (SBI) request message traffic among producer NFs by the query originator, and generating and sending to the query originator, an NF discovery response including the NF profiles.

12. The system of claim 11 wherein the query originator comprises a consumer NF or a service communication proxy (SCP).

13. The system of claim 11 comprising a locality and traffic distribution mappings database including records that map combinations of target NF type and preferred locality attribute values to preferred location attribute values and the traffic distribution attribute values.

14. The system of claim 13 wherein, in selecting the NF profiles, the NF discovery manager is configured to access the locality and traffic distribution mappings database using the target NF type attribute value and the preferred locality attribute value in the NF discovery request.

15. The system of claim 13 wherein the preferred location attribute values correspond to locations selected by a network operator to override the preferred locality attribute value in the NF discovery request.

16. The system of claim 15 wherein the preferred location attribute values include, in at least one record in the locality and traffic distribution mappings database, at least a primary location attribute value, a secondary location attribute value, and a tertiary location attribute value.

17. The system of claim 13 wherein the traffic distribution attribute values comprise traffic distribution percentages.

18. The system of claim 17 wherein, in modifying at least one attribute value in the NF profiles according to the traffic distribution attribute values to achieve the predetermined distribution of SBI request message traffic among the producer NFs, the NF discovery manager is configured to compute fake capacity attribute values using the traffic distribution percentages and set capacity attribute values in the NF profiles to the fake capacity attribute values.

19. The system of claim 11 wherein the NF discovery manager is configured to maintain configured priority attribute values in the NF profiles.

20. A non-transitory computer readable medium having stored thereon executable instructions that when executed by a processor of a computer control the computer to perform steps comprising:
receiving, by a network function (NF) repository function (NRF) and from a query originator, an NF discovery request including a target NF type attribute value and a preferred locality attribute value;
selecting, by the NRF, NF profiles that have an NF type attribute value that matches the target NF type attribute value and a locality attribute value that matches one of a plurality of preferred location attribute values mapped to the preferred locality attribute value;
modifying, by the NRF, at least one attribute value in the NF profiles according to traffic distribution attribute values to achieve a predetermined distribution of service based interface (SBI) request message traffic among producer NFs by the query originator; and
generating and sending, by the NRF and to the query originator, an NF discovery response including the NF profiles.

* * * * *